United States Patent
Drutchas et al.

[15] 3,707,312
[45] Dec. 26, 1972

[54] FOUR WHEEL SKID CONTROL SYSTEM WITH DYNAMIC PROPORTIONING

[72] Inventors: Gilbert H. Drutchas, Birmingham; Rupert L. Atkin, Grosse Pointe Woods, both of Mich.; Garrett D. Shaw, Rolling Hills, Calif.

[73] Assignee: TRW Inc., Cleveland, Ohio

[22] Filed: Jan. 22, 1971

[21] Appl. No.: 108,848

[52] U.S. Cl. ............................ 303/21 F, 188/181 C
[51] Int. Cl. .............................. B60t 8/06, B60t 8/12
[58] Field of Search ................. 303/21 EB, 21 F, 10; 188/181 C

[56] References Cited

UNITED STATES PATENTS

| 3,312,509 | 8/1965 | Highley | 303/21 F |
| 2,992,046 | 7/1961 | Mortimer | 303/21 F X |

*Primary Examiner*—Edward A. Sroka
*Attorney*—Hill, Sherman, Meroni, Gross & Simpson

[57] ABSTRACT

Dynamic pressure control means responsive to differences in the front and rear wheels speeds apply more or less pressure to the front brake actuating motors thereby to maintain an optimum relationship of front-to-rear wheel slip.

10 Claims, 2 Drawing Figures

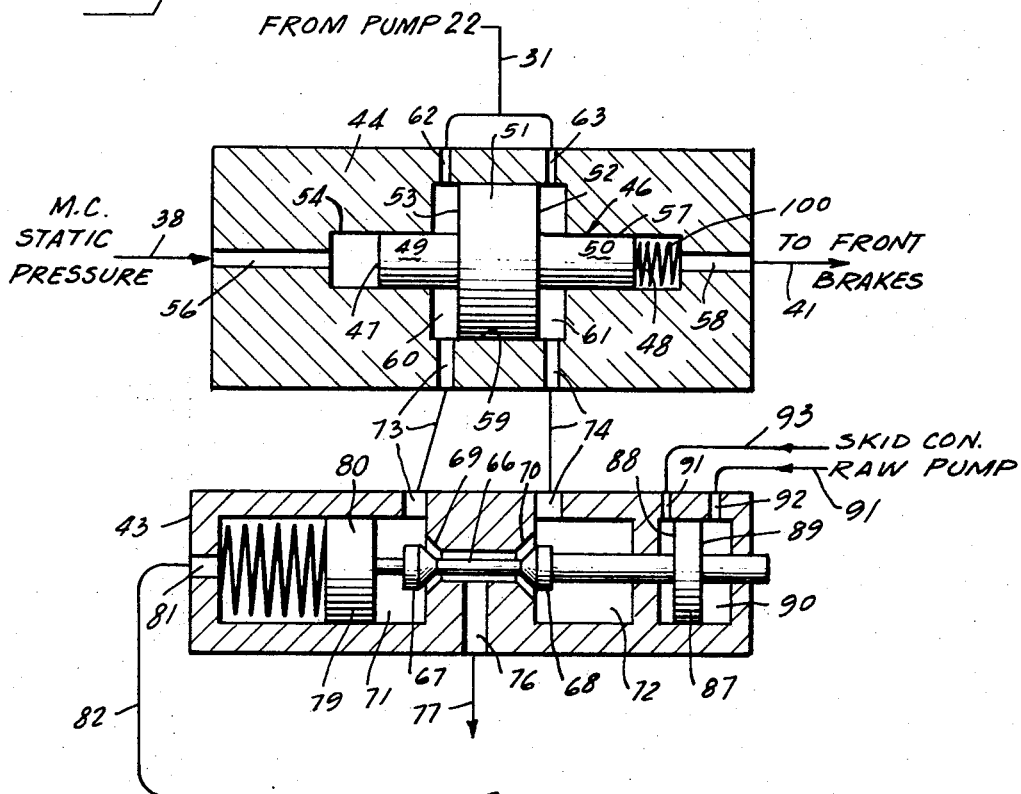
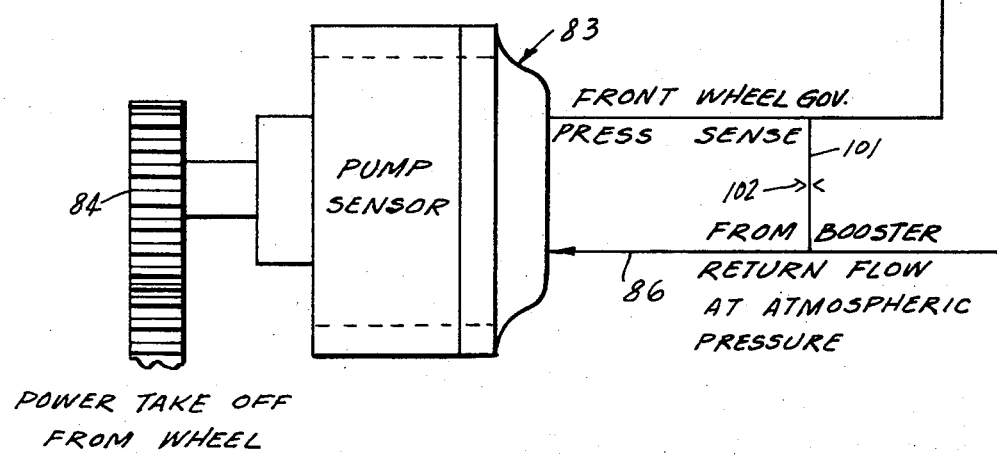

3,707,312

FOUR WHEEL SKID CONTROL SYSTEM WITH DYNAMIC PROPORTIONING

BACKGROUND OF THE INVENTION

1. Field of the Invention

This invention relates generally to wheeled vehicles and more particularly to an hydraulic power brake system with skid control as utilized on wheeled vehicles.

2. Description of the Prior Art

It is a feature of many hydraulic braking systems for automobiles and other vehicles that the front wheel braking motors are actuated by a system separate from the rear wheel braking motors. Also, the front wheels may utilize disk brakes while the rear wheels utilize drum brakes. Thus, in attempting to provide an hydraulic braking system with skid control, a problem of premature braking or overbraking action is sometimes presented in connection with the front wheels and, under other conditions with the rear wheels, and it is highly desirable to maintain an optimum relationship of front-to-rear wheel slip.

SUMMARY OF THE INVENTION

In accordance with the present invention, a power brake system with skid control utilizes separate front and rear braking motors. A master cylinder booster actuated by the vehicle operator when braking is desired transmits static master cylinder pressure to the front wheels via a differential area piston constituting an element of an up-down valve which forms one part of a dynamic proportioning means. The differential area piston has an enlarged set of piston areas exposed to dynamic pressure furnished by a power source such as the power steering pump of the vehicle.

In order to selectively control the application of dynamic pressure to the piston, thereby to supplement the action of the master cylinder pressure on the front wheel brakes, a slip or speed-control valve is provided which may utilize, in accordance with the present invention, two separate spool areas. When open, the slip or speed control valve vents two adjacent chambers communicating with the enlarged piston areas so there will be no pressure build up. Signal means are provided for applying a net signal to the slip or speed control valve. The net signal is derived as the functional relationship or rear wheel rotation and front wheel rotation. For example, a skid control pump operable as a function of the rear wheel rotation may be relied upon to generate one signal applied to one end of the spool of the slip or speed control valve and a front wheel sensor may be relied upon to generate a second signal applied to the other end of the spool. Thus, the pressure to the front wheel brakes is raised or lowered to maintain an optimum relationship of front-to-rear wheel slip.

BRIEF DESCRIPTION OF THE DRAWINGS

FIG. 1 is a plumbing diagram which is somewhat schematic of the hydraulic circuitry of the overall system.

FIG. 2 is a somewhat schematic view of the dynamic proportioning means provided in accordance with the principles of the present invention and as incorporated in the system of FIG. 1.

DESCRIPTION OF THE PREFERRED EMBODIMENTS

Referring, first of all, to FIG. 1, there is shown a vehicle having front wheels 10 and 11 each provided respectively with brake actuating motors 12 and 13. It will be understood that the brake actuating motors 12 and 13 may be of any selected form and type, for example, those used with disk brakes, drum brakes or other forms of braking means.

The vehicle is motor driven and has a transmission extension housing shown at 14 and a propeller shaft 16 for delivering power to the rear wheels which are shown at 17 and 18. The rear wheels have separate brake motor means shown at 19 and 20, respectively.

The transmission extension housing is shown a second time in the schematic view of FIG. 1 and has closely associated therewith a skid control pump identified at 21 and which may take the form of a positive displacement rotary pump rotatable as a function of the rear wheel speed. For example, the skid control pump may be driven by an operative coupling to the transmission or the propeller shaft 16.

The vehicle is also equipped with a power steering pump shown at 22 which may be driven off the fan belt via a pulley 23 and which furnishes pressure via a conduit 24 to a power steering gear 26, thereby to provide power assistance in the steering of the dirigible vehicle. A return line 27 returns fluid to the inlet of the power steering pump 22. A second discharge conduit 28 bypasses the power steering gear 26 and joins as at 29 with a discharge conduit 30 exiting from the power steering gear 26 whereupon the fluid from the power steering pump is transmitted via a conduit 31 to a hydraulic booster mechanism shown generally at 32.

For purposes of the description of this invention, it may be noted that the hydraulic booster 32 is adapted to be actuated by the operator of the vehicle, for example, via a pedal 33 acting on an actuating rod 34. The hydraulic booster 32 incorporates a dual master cylinder arrangement as shown at 36, master cylinder pressure being supplied upon actuation of the pedal 33 through a conduit 37 to the rear brakes, i.e., the brake motors 19 and 20 of the rear wheels 17 and 18, respectively.

A conduit 38 conducts static master cylinder pressure to the dynamic proportioning means of the present invention shown generally in FIG. 1 at 40 and such pressure is ultimately transmitted to the front brakes via the conduit 41, it being understood that the conduit 41 transmits such pressure to the brake motors 12 and 13 of the front wheels 10 and 11.

In accordance with the principles of the present invention, the structure and operation of the dynamic proportioning means are illustrated in connection with FIG. 2.

We have determined from an examination of braking devices that a relationship exists between the maximum road torque and the wheel-to-road slip factor. Such relationship can be expressed in the form of graphical curves which relate $\mu$, or braking torque to slip.

The purpose of the present invention is to provide a means of controlling front wheel slip during braking in relationship to rear wheel slip where the rear brake motor means is controlled by a slip, torque, speed or deceleration limiting device that prevents rear wheel lock-up during impending lock conditions, and is capable of seeking a near optimum slip, torque relationship. The present system provides torque equilibrium between brake torque and surface torque at the maximum available value of surface torque.

Those versed in the art will appreciate that there exists an implicit relationship during braking that permits the use of a single torque sense to control both front and rear wheels. The relationship is meaningful because the front and rear wheels are part of the same vehicle assembly and are separated by a nominal, finite distance so that under virtually all road conditions similar tire-to-road interface conditions are developing at each axle position.

Since the present disclosure provides a means for controlling front wheel speed at near optimum torque values, the system of the present invention inherently compensates front brakes for the faded brakes, vehicle load variations or uphill and downhill braking conditions.

The dynamic proportioning means of the present invention constitutes a dynamic proportioning valve having first and second elements shown at 42 and 43, respectively.

More specifically, the first valve element constitutes what may be referred to as an up-down valve, while the second valve element 43 constitutes a so-called slip or speed control valve.

Referring, first of all, to the up-down valve 42, it will be noted that a valve body 44 has a differential area piston 46. The differential area piston 46 has two smaller piston areas at opposite ends thereof, one of the piston areas being shown at 47 and the other at 48. The piston areas 47 and 48 are located on the ends of a piston plunger 49 and 50, respectively.

The piston 46 has an enlarged intermediate portion 51 and a second set of larger piston areas are provided on such enlarged portion 51 and are oppositely disposed with respect to one another, the first larger area being shown at 52 and the second being shown at 53.

The piston plunger 49 is received in a cylinder bore 54 and a passage 56 is connected to master cylinder static pressure via the conduit 38.

The piston plunger 50 is received in a cylinder bore 57 and the cylinder bore 57 has a plassage 58 which directs pressure to the front brakes via a conduit 41.

Thus, when master cylinder static pressure is increased upon actuation of the pedal 33, such master cylinder static pressure will be transmitted to the front brakes via the valve element 42 through the piston areas 47 and 48 on the piston plungers 49 and 50.

The enlarged piston 51 is received in a cylinder bore 59. Dynamic pressure is supplied to a cavity 60 formed on one side of the enlarged piston 51 adjacent the enlarged pressure area 53 and to a second cavity 61 formed adjacent the pressure area 52 from the power steering pump 22 via the conduit 31. A passage 62 is shown in communication with the cavity 60 and a passage 63 is shown in communication with the cavity 61.

The second valve element 43 or valve element which is sometimes referred to as the slip or speed control valve constitutes a spool valve having a spool 66 formed with two spool sections 67 and 68 which are axially spaced from one another and which are disposed to cooperate and selectively seat against a valve seat 69 and a valve seat 70, respectively.

A cavity 71 is formed adjacent the spool section 67 and a cavity 72 is formed adjacent the spool section 68. Between the cavity 71 and the cavity 60, there is formed a passage 73 and between the cavity 61 and the cavity 72 there is formed a passage 74. There is also a passage 76 which is connected to a conduit 77 leading back to the inlet of the skid control pump 21. Thus, when the spool valve 66 is positioned with the spool sections 67 and 68 open, each of the cavities 71 and 72 will freely output through the slip or speed control valve 43 to drain so that no pressure registers in the respective cavities 71 and 72. Since the cavities 60 and 61 are vented to the corresponding cavities 71 and 72, the dynamic pressure acting on the pressure areas 53 and 52 will be correspondingly controlled.

The cavity 71 constitutes a cylindrical bore and slidingly receives an enlarged spool land 79. The rear face of the spool land 79 is shown at 80 and is referenced by means of a passage 81 and a conduit 82 to a front wheel governor pressure sense shown generally at 83.

Although various electronic and mechanical sensing means could be provided, the illustrative embodiment herein shown for purposes of illustrating the principles of the present invention constitutes a pump sensor rotatably driven by a power take-off from the front wheel as shown at 84, an orifice 102 is provided in conduit 101 that provides a pressure signal which is a function of the rotational wheel speed of the front wheels. A return conduit is shown at 86 which is connected to the conduit 77 in the system diagram of FIG. 1. Thus, a pressure signal which is a function of the rotational speed of the front wheels is imposed on one end of the spool 66.

At the other end of the spool 66, there is provided an enlarged land 87 having pressure areas 88 and 89 on opposite sides thereof. The land 87 moves in a cylindrical recess or cavity 90. Both sides of the cavity 90 are communicated to the skid control pump but on opposite sides of a flow control orifice located within the skid control pump. Thus, raw pump pressure is furnished via a conduit 91 and a passage 92 into one side of the recess 90 and the pressure on the downstream side of the orifice is conducted into the other side of the recess 90 via a conduit 93 and a passage 94. The net effect is to apply a signal to the end of the spool 66 which is a function of the pressure drop across the orifice and which is, in turn, derived as a function of the average rotational speed of the rear wheels since the differential is interposed between the skid control pump and the rear wheels 10 and 11.

The various functions and operations of the valve elements 42 and 43 can now be described in connection with the different modes encountered in typical driving situations.

Mode I — Down-The-Road Brakes Unapplied

In this mode, the slip or speed control valve 43 has its spool sections 67 and 68 in an open position as shown in FIG. 2 allowing both sides of the cavities 71 and 72 to freely output through the slip or speed control valve 43 to drain so that no pressure registers in the cavities 71 and 72 and, accordingly, both cavities 60 and 61 will likewise be vented. No braking pressure will be applied by the differential piston 46.

Mode II — Proportional Stop

When both the pump sensor 83 and the skid control 21 are balanced, braking pressure from the master cylinder 36 enters the passage 38 and the passage 56 and registers on the piston area 47 within the cylinder bore 54. Since there is no upgrading or downgrading signals operating on the enlarged piston surfaces 53 and 52, the transmitted pressure is substantially a 1/1 pressure ratio through the differential piston 46 and the piston plungers 49 and 50 and the cylindrical recess 57 through the passage 58 and the conduit 41 to the brake actuating motors 12 and 13 of the front wheels 10 and 11.

Mode III — Higher Front Brake Pressure Requirement "Upping"

A sudden increase in sense pressure from the front sensor 83 causes the slip or speed control valve 43 to operate so that the spool section 67 will close or will bias towards a closed position while forcing the spool section 68 to open wider. The closure of the spool section 67 restricts the skid control pump power source flow and builds up pressure in the cavity 71 and hence in the cavity 60 and on the enlarged pressure area 53 while the opening of the spool section 68 keeps the cavity 72 and the cavity 61 vented so that the enlarged piston area 52 is virtually at atmospheric pressure.

The master cylinder force effect acting on the piston surface 47 through the passage 56 is reinforced by the force effect on the enlarged piston area 53 so that the net pressure rises in the cavity 57 to the front brake motors 12 and 13. This pressure rises until the front sensor 83 speed-pressure signal is balanced, thus, the proper rear-to-front slip ratio is attained.

Mode IV — Lower Brake Pressure Requirement

On low friction co-efficient surfaces, the disproportionate braking capabilities of the front and rear brakes with the commonly used disk, front and duo-servo drum rear brake types requires the front braking pressure to be lower than the rear. This is due to the fact that the front brakes do not normally use return springs comparable to those used on the rear brakes. Accordingly, the valving system of the present invention responds in the following manner.

The front sensor 83 will signal a sudden drop in output sense signal. The relatively high pressure signal from the skid control pump 21 tends to close the spool section 68 on the spool 66, thereby blocking the egress path of flow through the passage 74, while the slip or speed control spool section 67 remains open to the passage 73 and the cavity 60. The rising pressure on the piston face 52 will force the up-down differential area piston 46 to the left, using the orientation of FIG. 2, thereby decreasing the pressure in the cavity 57 until the two speed signals front and rear are equalized.

Mode V — Faded Brakes, Uphill and Downhill or Vehicle Load Variations

Since faded front brakes result in a decrease in front wheel braking force, the sensor 83 increases speed accordingly, and the system reacts in a manner similar to that described under Mode III with a "higher braking pressure requirement". The system also reacts in a manner similar to Mode III when the front wheel normal force increases during a downhill braking effort, or when passenger or luggage loads increase the normal force on the front axle. Conversely, uphill front wheel loads will reduce the speed of the front sensor 83 and allow the system to react as in Mode IV with a lower front braking requirement.

It should be noted that the differential piston 46 is provided with a preloading spring shown at 100. The spring 100 is bottomed within the cavity 57 and engages the smaller pressure area 48, thereby to preload the differential area piston 46 in direction. It will be noted that the pressure in the cavity 57 will not rise until the initial preload on the spring 100 is overcome. The limit in pounds per square inch at which the spring 100 starts to compress is known as the "hold-off pressure", while the action is referred to as the "hold-off function". This function is needed to prevent drag on the front disk brakes under small residual pressures. Thus, in braking action, it may be desirable to set the spring 100 to achieve a desired hold-off level to match the effect of shoe return springs on the rear drum brakes.

Those versed in the art will also recognize that once the wheel's decel bias drives the wheel speed down, particularly on surfaces with a low coefficient of friction, the recovery of wheel speed, triggered by the skid control system, is made difficult due to the lack of traction or spin-up of the tires. Such premature overbraking action of the front disk brakes with its subsequent increase in front wheel slip is controlled by the hold-off valving function represented by the spring 100 and the differential area piston 46.

Although various minor modifications might be suggested by those versed in the art, it should be understood that we wish to embody within the scope of the protection warranted thereon all such modifications as reasonably and properly come within the scope of our contribution to the art.

We claim:

1. In combination with a vehicular braking system having skid control, a dynamic proportioning valve comprising first and second valve elements,
    said first valve element comprising a differential area piston having separate piston areas on opposite ends thereof and having oppositely disposed enlarged piston areas at an intermediate portion thereof,
    operator actuated means for supplying static pressure to one of said separate piston areas,
whereby a corresponding pressure is delivered by the opposite separate pressure areas to a point of utilization,
    a vehicle actuated means supplying dynamic pressure to said oppositely disposed enlarged piston areas,
    said second valve element comprising a spool valve having a pair of axially spaced spool sections allowing when open corresponding cavities adjacent each spool section to freely output through the second valve element to drain so that no pressure registers in such cavities,
means communicating each corresponding cavity to said dynamic pressure acting on corresponding of said oppositely disposed enlarged piston areas, and means for applying a variable pressure signal to opposite ends of said spool valve which is a function of the difference in speed between the front and rear wheels of the vehicle, whereby said spool valve will control the dynamic proportioning of pressure acting on said first valve element with an optimum relationship of front-to-rear wheel slip.

2. A skid controller for a vehicle having two sets of wheels including front wheels and rear wheels each having their own brake motors and comprising, a means for measuring rear wheel speed, a means for measuring front wheel speed, an external power means for supplying pressure to separate front and rear brake actuating motors, and dynamic pressure control means responsive to differences in front and rear wheel speeds, thereby to apply more or less pressure to the front brake actuating motors to maintain an optimum relationship of front-to-rear wheel slip.

3. For use in a skid controller, a dynamic proportioning valve comprising first and second valve elements, said first valve element comprising an up-down valve having a differential area piston formed with separate piston areas on opposite ends thereof and having oppositely disposed enlarged piston areas at an intermediate portion thereof, means for supplying master cylinder pressure to one of said separate piston areas, whereby a corresponding pressure may be delivered by the opposite separate pressure area to the front wheels of the vehicle, and means for supplying dynamic pressure from a power source to said oppositely disposed enlarged piston areas, said second valve element comprising a speed control spool valve having a pair of axially spaced spool sections allowing when open corresponding cavities adjacent each respective spool section to freely output through the second valve element to drain so that no pressure registers in the cavities, means communicating each corresponding cavity to said dynamic pressure acting on corresponding of said oppositely disposed enlarged piston areas, means for applying a rear wheel generated pressure signal to one end of said spool valve, and means for applying a front wheel generated pressure signal to the other end of said spool valve, whereby the spool valve will control the dynamic proportioning of pressure acting on the first valve element to maintain an optimum relationship of front-to-rear wheel slip.

4. The method of dynamically proportioning front-to-rear wheel slip in a vehicular braking system with skid control which includes the steps of transmitting a static master cylinder pressure via a differential area piston to the front wheels of the vehicle, supplying dynamic pressure from a power source for application to the differential area piston, thereby to selectively supplement the master cylinder pressure, and selectively controlling the application of said dynamic pressure to the different area piston in response to a net signal derived as a functional relation of rear wheel rotation and front wheel rotation, thereby to maintain an optimum relationship of front-to-rear wheel slip.

5. Dynamic proportioning means for a vehicular braking system with skid control comprising, a differential area piston having a first set of smaller areas for transmitting master cylinder pressure to the front wheel braking means in a 1/1 proportion and having a second set of larger areas for receiving dynamic pressure from a power source to transmit augmented pressure to the front wheel braking means, and a slip control valve comprising a spool having two spool sections for venting dynamic pressure from said second set of larger areas to drain when said two spool sections are open so that no pressure registers on such larger areas, and means for applying signals to opposite ends of said spool which are respectively a function of rear wheel rotation and front wheel rotation so that the net effective signal acting on said spool will dynamically proportion the dynamic pressure acting on said piston to maintain an optimum front-to-rear wheel slip.

6. Dynamic proportioning means as defined in claim 5 and further characterized by a preloading spring acting on said differential area piston to exert hold-off pressure on said piston, thereby developing a hold-off function to prevent drag on the front wheel brakes under small residual pressures.

7. An hydraulic power brake system with skid control comprising, separate front and rear braking motors for a wheeled vehicle, a skid control pump rotational as a function of the rotational speed of the rear wheels, a second pump operable as a power source, a master cylinder booster for actuation by the vehicle operator when braking is desired, a front wheel sensor rotatable as a function of the rotational speed of the front wheels, and a dynamic proportioning means for maintaining a relationship in front-to-rear wheel slip comprising, an up-down valve having a differential area piston formed with a first set of smaller piston areas and a second set of larger piston areas, means for applying master cylinder static pressure to one of said smaller piston areas whereby the other of said smaller piston areas will transmit a corresponding pressure to the front wheel braking motors, means for transmitting pressure from said power source to said larger piston areas, a slip control valve comprising a spool having a pair of spool sections which when open will vent a corresponding one of said larger piston areas to drain so no pressure registers thereon, and means for applying a signal generated by said skid control pump to one end of said spool and for applying a signal generated by said front wheel sensor to the other end of said spool, whereby the net signal operating on said spool will position the spool to raise and lower the dynamic pressure loading of said differential area piston.

8. An hydraulic power braking system with skid control as defined in claim 7 wherein said second pump is the vehicle power steering pump.

9. A power brake system with skid control comprising,
separate front and rear braking motors for a wheeled vehicle,
a master cylinder booster for actuation by the vehicle operator when braking is desired,
and a dynamic proportioning means for maintaining front-to-rear wheel slip comprising,
an up-down valve having a differential area piston with a first set of piston areas in the proportion of 1/1 and a second set of larger piston areas,
means for transmitting master cylinder static pressure through the smaller piston areas to the front braking motors,
means for transmitting dynamic pressure from a source to the larger piston areas,
and a slip control valve for selectively venting either or both of said larger piston areas as a function of valve position,
and signal means for applying a net signal to the slip control valve which is derived as the functional relationship of rear wheel rotation and front wheel rotation,
thereby to maintain an optimum front-to-rear wheel slip relationship.

10. For use in a wheeled vehicle skid controller,
a dynamic proportioning valve having means for dynamically proportioning pressure to the front and rear braking motors of the wheeled vehicle,
operator actuated means for supplying operator generated pressure to said valve,
power operated means for supplying dynamically generated pressure to said valve,
means for applying a rear wheel generated pressure signal to said valve,
and means for applying a front wheel generated signal to said valve,
whereby said valve will maintain an optimum relationship of front-to-rear wheel slip.

* * * * *